United States Patent
Nishida et al.

(10) Patent No.: US 11,535,685 B2
(45) Date of Patent: Dec. 27, 2022

(54) METHOD FOR PRODUCING ETHYLENE-VINYL ACETATE COPOLYMER

(71) Applicant: KURARAY CO., LTD., Okayama (JP)

(72) Inventors: Naoto Nishida, Okayama (JP); Kazuyuki Somemiya, Okayama (JP)

(73) Assignee: KURARAY CO., LTD., Okayama (JP)

(*) Notice: Subject to any disclaimer, the term of this patent is extended or adjusted under 35 U.S.C. 154(b) by 88 days.

(21) Appl. No.: 17/059,566

(22) PCT Filed: May 29, 2019

(86) PCT No.: PCT/JP2019/021253
§ 371 (c)(1),
(2) Date: Nov. 30, 2020

(87) PCT Pub. No.: WO2019/230781
PCT Pub. Date: Dec. 5, 2019

(65) Prior Publication Data
US 2021/0230314 A1 Jul. 29, 2021

(30) Foreign Application Priority Data
May 30, 2018 (JP) .............................. JP2018-104045

(51) Int. Cl.
*C08F 2/06* (2006.01)
*C08F 2/01* (2006.01)
(Continued)

(52) U.S. Cl.
CPC .................. *C08F 2/06* (2013.01); *C08F 2/01* (2013.01); *C08F 210/02* (2013.01); *C08F 218/08* (2013.01); *C08K 5/0025* (2013.01)

(58) Field of Classification Search
USPC .................................................... 526/68, 331
See application file for complete search history.

(56) References Cited

U.S. PATENT DOCUMENTS 3,891,603 A * 6/1975 Heil ..................... C08F 10/00
526/329
4,657,994 A 4/1987 Tanaka et al.
(Continued)

FOREIGN PATENT DOCUMENTS

CN 1088942 A 7/1994
JP S60-53513 A 3/1985
(Continued)

OTHER PUBLICATIONS

Office Action issued in corresponding Chinese Patent Application No. 201980002312.7 dated Mar. 20, 2020.
(Continued)

*Primary Examiner* — Fred M Teskin
(74) *Attorney, Agent, or Firm* — Morgan, Lewis & Bockius LLP (57) ABSTRACT

A method of continuously producing an ethylene-vinyl acetate copolymer in a polymerization vessel containing a reaction liquid containing ethylene, vinyl acetate, a polymerization initiator and methanol, the polymerization vessel being connected via piping to a heat exchanger circulating a coolant, the method includes the steps of: supplying ethylene, the polymerization initiator and methanol to the polymerization vessel; introducing pressurized gas containing ethylene present in a gas phase portion of the polymerization vessel into the heat exchanger; supplying vinyl acetate cooled to between −50° C. and 23° C. to an upper portion of the heat exchanger; flowing vinyl acetate down in the heat exchanger while absorbing ethylene; letting vinyl acetate dissolving ethylene out of a bottom portion of the heat exchanger and adding to the reaction liquid in the polymerization vessel; and taking the reaction liquid out of the polymerization vessel. This provides a method of efficiently (Continued)

removing heat during polymerization of an ethylene-vinyl acetate copolymer.

15 Claims, 2 Drawing Sheets

(51) Int. Cl.
  *C08F 210/02* (2006.01)
  *C08F 218/08* (2006.01)
  *C08K 5/00* (2006.01)

(56) References Cited

U.S. PATENT DOCUMENTS

| | | | |
|---|---|---|---|
| 6,060,564 A | 5/2000 | Uchida et al. | |
| 6,777,505 B2 * | 8/2004 | Takai | B01J 19/18 |
| | | | 526/331 |
| 2002/0077438 A1 | 6/2002 | Nagao | |
| 2002/0156335 A1 | 10/2002 | Kawahara et al. | |
| 2002/0176812 A1 | 11/2002 | Takai et al. | |

FOREIGN PATENT DOCUMENTS

| | | |
|---|---|---|
| JP | H08-231643 A | 9/1996 |
| JP | H11-116637 A | 4/1999 |
| JP | 2000-198803 A | 7/2000 |
| JP | 2002-128807 A | 5/2002 |
| JP | 2002-338607 A | 11/2002 |
| JP | 2002-356517 A | 12/2002 |

OTHER PUBLICATIONS

International Search Report issued in corresponding International Patent Application No. PCT/JP2019/021253 dated Aug. 20, 2019.

* cited by examiner

METHOD FOR PRODUCING ETHYLENE-VINYL ACETATE COPOLYMER

TECHNICAL FIELD

The present invention relates to a method of producing an ethylene-vinyl acetate copolymer.

BACKGROUND ART

Ethylene-vinyl alcohol copolymers (hereinafter, may be referred to as EVOHs) are thermoplastic resins excellent in gas barrier properties, fuel barrier properties, chemical resistance, stain resistance, antistatic properties, mechanical strength, and the like. Taking advantage of such characteristics, they are shaped in the form of a film, a sheet, a bottle, a cup, a tube, a pipe, and the like to be used in various applications including packaging containers. Such an EVOH is generally produced by saponifying an ethylene-vinyl acetate copolymer (hereinafter, may be referred to as an EVA) and there is an expectation for a method of efficiently producing a high-quality EVA.

An EVA is produced by copolymerizing ethylene and vinyl acetate, and since the polymerization reaction is exothermic reaction, the heat of polymerization has to be removed from the reaction liquid. Various methods have been proposed to efficiently remove the heat of polymerization from the reaction liquid.

Patent Document 1 describes a method of continuously polymerizing an EVA using a polymerization vessel having a cooling mechanism provided by a jacket and/or a coil under the conditions that the heat transfer area of the jacket and/or the coil and the amount of heat generated by the polymerization satisfy a specific relationship. However, use of the cooling jacket causes difficulty in increasing the contact area between the inner wall of the cooled polymerization vessel and the reaction liquid and thus causes a problem of reducing the efficiency of heat removal for a greater volume of the polymerization vessel. Meanwhile, use of the cooling coil facilitates improving the efficiency of heat removal by increasing the contact area with the reaction liquid, whereas retained portions are likely to be formed in the reaction liquid and there is a risk of forming deteriorated products of the polymer in the retained portions. Use of either the jacket or the coil causes the reaction liquid to be partially at low temperatures and thus an increase in viscosity is inevitable in these portions, thereby promoting the retention of the reaction liquid.

Patent Document 2 describes a method of removing heat from a reaction liquid, during polymerization of an EVA in the reaction liquid containing ethylene, vinyl acetate, methanol, and a polymerization initiator, by condensing vapor vaporized from the reaction liquid with a heat exchanger. In this case, cooling is performed in the gas phase portion not in the liquid phase portion and thus the problem of retention of the reaction liquid does not arise while there is a problem of adhesion of scales in the heat exchanger. In addition, this method includes direct cooling and condensing the vapor of vinyl acetate and methanol, and thus the efficiency of heat removal is not necessarily good.

Meanwhile, Patent Document 3 describes a method of continuously polymerizing an EVA while cooling a top plate of the polymerization vessel by mounting a cooling coil outside the top plate. In this case, the problem of scale adhesion is less likely to occur while it is not easy to increase the top plate area and thus reduction in the efficiency of heat removal is inevitable for a greater volume of the polymerization vessel.

Patent Document 4 describes a method of continuously polymerizing an EVA in a polymerization solution containing ethylene, vinyl acetate, methanol, and a polymerization initiator, the method comprising: introducing vinyl acetate into a heat exchanger to cause ethylene let out of a polymerization vessel to be absorbed by vinyl acetate in the heat exchanger; and introducing vinyl acetate with ethylene dissolved therein into the polymerization vessel. In this method, vinyl acetate contacts with ethylene in a countercurrent flow in the heat exchanger. This method is described to allow not only cooling of vinyl acetate in the heat exchanger but also removal of latent heat of ethylene dissolution and thus to be capable of efficient heat removal. The efficiency of heat removal is, however, sometimes insufficient. In addition, while rising in the heat exchanger, the gas containing ethylene sometimes lifts vinyl acetate that is flowing down to spout vinyl acetate into an upper portion of the heat exchanger. Such a phenomenon is so-called flooding, which interferes with stable production.

Patent Document 5 describes, similar to Patent Document 4, a method comprising: causing ethylene let out of a polymerization vessel to be absorbed by vinyl acetate in a heat exchanger; and then introducing vinyl acetate with ethylene dissolved therein into the polymerization vessel while vinyl acetate contacts with ethylene in a parallel flow in the heat exchanger. This method is described to allow preventing the flooding in the heat exchanger. The efficiency of heat removal is, however, still sometimes insufficient.

PRIOR ART DOCUMENTS

Patent Documents

Patent Document 1: JP 2002-128807 A
Patent Document 2: JP 2002-356517 A
Patent Document 3: JP 11-116637 A
Patent Document 4: JP 60-53513 A
Patent Document 5: JP 2002-338607 A

SUMMARY OF THE INVENTION

Problems to be Solved by the Invention

The present invention has been made to solve the above problems, and it is an object thereof to provide a method of efficiently removing heat during polymerization of an EVA.

Means for Solving the Problems

The above problems are solved by providing a method of continuously producing an ethylene-vinyl acetate copolymer in a polymerization vessel containing a reaction liquid containing ethylene, vinyl acetate, a polymerization initiator and methanol, the polymerization vessel being connected via piping to a heat exchanger circulating a coolant, the method comprising the steps of:

supplying ethylene, the polymerization initiator and methanol to the polymerization vessel;

introducing pressurized gas containing ethylene present in a gas phase portion of the polymerization vessel into the heat exchanger;

supplying vinyl acetate cooled to between −50° C. and 23° C. to an upper portion of the heat exchanger;

flowing vinyl acetate down in the heat exchanger while absorbing ethylene;

letting vinyl acetate dissolving ethylene out of a bottom portion of the heat exchanger and adding to the reaction liquid in the polymerization vessel; and taking the reaction liquid out of the polymerization vessel.

In a preferred embodiment of this method, the pressurized gas containing ethylene is supplied to the upper portion of the heat exchanger to contact the pressurized gas containing ethylene with vinyl acetate in a parallel flow in the heat exchanger. In another preferred embodiment of this method, the pressurized gas containing ethylene is supplied to a lower portion of the heat exchanger to contact the pressurized gas containing ethylene with vinyl acetate in a countercurrent flow in the heat exchanger.

In the above production method, vinyl acetate cooled to between −50° C. and 10° C. is supplied to the upper portion of the heat exchanger. It is also preferred that the ethylene-vinyl acetate copolymer thus obtained has an ethylene content from 15 to 55 mol %. It is also preferred that the heat exchanger is a wetted-wall heat exchanger.

Effects of the Invention

The production method of the present invention allows efficient heat removal during polymerization of an EVA and improvement of the productive capacity without major modification of the equipment.

MODES FOR CARRYING OUT THE INVENTION

The present invention is a method of continuously producing an ethylene-vinyl acetate copolymer in a polymerization vessel containing a reaction liquid containing ethylene, vinyl acetate, a polymerization initiator and methanol, the method comprising the steps of:

supplying ethylene, a polymerization initiator and methanol to the polymerization vessel;

introducing pressurized gas containing ethylene present in a gas phase portion of the polymerization vessel into the heat exchanger;

supplying vinyl acetate cooled to between −50° C. and 23° C. to an upper portion of the heat exchanger;

flowing vinyl acetate down in the heat exchanger while absorbing ethylene;

letting vinyl acetate dissolving ethylene out of a bottom portion of the heat exchanger and adding to the reaction liquid in the polymerization vessel; and taking the reaction liquid out of the polymerization vessel.

The present invention relates to a method of continuously producing an ethylene-vinyl acetate copolymer (an EVA) in a polymerization vessel containing a reaction liquid containing ethylene, vinyl acetate, a polymerization initiator and methanol. In this context, methanol is a solvent, and ethylene and vinyl acetate are copolymerized in the methanol solution in the presence of the polymerization initiator to produce an EVA. For continuous production of an EVA, each of the above steps proceeds concurrently. Since methanol functions as a chain transfer agent, adjustment of the amount to be added allows controlling the degree of polymerization of an EVA to be obtained.

The reaction liquid in the polymerization vessel contains ethylene, vinyl acetate, a polymerization initiator and methanol, and ethylene and vinyl acetate are copolymerized to obtain an ethylene-vinyl acetate copolymer. For polymerization of an EVA, another copolymerizable monomer other than vinyl acetate and ethylene may be supplied at the same time to be copolymerized. Examples of the monomer may include: α-olefins, such as propylene, n-butene, i-butene, 4-methyl-1-pentene, 1-hexene, and 1-octene; unsaturated carboxylic acids, such as itaconic acid, methacrylic acid, acrylic acid, and maleic acid, and salts thereof, partial and complete esterification products thereof, amides thereof, and anhydrides thereof; vinylsilane compounds, such as vinyltrimethoxysilane; unsaturated sulfonic acids and salts thereof; alkylthiols; vinyl pyrrolidones; and the like.

The polymerization initiator is not particularly limited but it is preferred to use at least one selected from diacyl peroxide initiators, valeronitrile initiators, and peroxydicarbonate initiators. Examples of the diacyl peroxide polymerization initiators may include acetyl peroxide, dipropyl peroxide, isobutyryl peroxide, benzoyl peroxide, and dilauroyl peroxide. Examples of the valeronitrile polymerization initiators may include 2,2'-azobis(2,4,4'-trimethylvaleronitrile), 2,2'-azobis(2,4-dimethylvaleronitrile), 2,2'-azobis(4-methoxy-2,4-dimethylvaleronitrile), 2,2'-azobis(4-ethoxy-2,4-diethylvaleronitrile), and 2,2'-azobis(4,4'-diethoxy-2-methylvaleronitrile). Examples of the peroxydicarbonate polymerization initiators may include dicyclohexyl peroxydicarbonate, bis-(4-t-butylcyclohexyl)peroxydicarbonate, and di-n-propyl peroxydicarbonate. Among them, acetyl peroxide, 2,2'-azobis(4-methoxy-2,4-dimethylvaleronitrile), di-n-propyl peroxydicarbonate, and dicyclohexyl peroxydicarbonate are preferred, and 2,2'-azobis(4-methoxy-2,4-dimethylvaleronitrile) is more preferred.

The reaction liquid in the polymerization vessel preferably has a temperature between 40° C. and 80° C. An excessively low reaction temperature causes reduction in production efficiency. The reaction temperature is more preferably 50° C. or more. In contrast, an excessively high reaction temperature causes difficulty in heat removal and may result in runaway of the polymerization reaction and coloration of an EVA resin to be obtained. The reaction temperature is more preferably 70° C. or less.

The pressure in the polymerization vessel is preferably between 1.5 and 8 MPa. A higher pressure in the polymerization vessel causes production of an EVA having a higher ethylene content. To obtain an EVOH with good gas barrier properties, it is preferred to produce an EVA having a low ethylene content. From this perspective, the pressure in the polymerization vessel is more preferably 6 MPa or less and even more preferably 5 MPa or less. A lower pressure in the polymerization vessel causes reduction in efficiency of heat removal and thus has greater significance of providing the cooled vinyl acetate to the heat exchanger by employing the present invention. Meanwhile, to obtain an EVOH excellent in flexibility, it is preferred to produce an EVA having a high ethylene content. From this perspective, the pressure in the polymerization vessel is more preferably 2 MPa or more, even more preferably 2.5 MPa or more, and particularly preferably 3 MPa or more. A higher pressure in the polymerization vessel facilitates absorption of ethylene by vinyl acetate in the heat exchanger and thus has a greater heat removal effect.

The method of producing an EVA of the present invention includes the step of supplying ethylene, the polymerization initiator, and methanol to a polymerization vessel. These materials are preferably supplied from a pipe directly connected to the polymerization vessel into the polymerization vessel. The materials are preferably introduced into the polymerization vessel per unit time in the proportion of, based on 100 parts by mass of vinyl acetate, from 8 to 60 parts by mass of ethylene, from 0.5 to 25 parts by mass of methanol, and from 0.001 to 0.05 part by mass of the polymerization initiator.

The method of producing an EVA of the present invention includes the step of introducing pressurized gas containing ethylene present in a gas phase portion of the polymerization vessel into the heat exchanger. The method also includes the step of supplying vinyl acetate cooled to between −50° C. and 23° C. to an upper portion of the heat exchanger. They cause cooled vinyl acetate and the pressurized gas containing ethylene to be supplied to the heat exchanger to contact with each other inside the heat exchanger. The vinyl acetate supplied to the upper portion of the heat exchanger has a temperature between −50° C. and 23° C. From the perspective of efficiency of heat removal, vinyl acetate preferably has a temperature of 10° C. or less, more preferably 5° C. or less, even more preferably 0° C. or less, and particularly preferably −5° C. or less. Meanwhile, cooling to less than −50° C. causes an increase in facility costs and the like. From this perspective, vinyl acetate preferably has a temperature of −40° C. or more and more preferably −30° C. or more. The method of cooling vinyl acetate is not particularly limited and may use a heat exchanger circulating a coolant and the like.

It is also possible to directly supply part of vinyl acetate to the polymerization vessel not through the heat exchanger while it sometimes causes reduction in efficiency of heat removal. The amount of vinyl acetate directly supplied to the polymerization vessel is preferably less than half of the entire amount of vinyl acetate and more preferably less than ¼. A particularly preferred embodiment is to supply substantially all vinyl acetate to the heat exchanger. During supply of vinyl acetate to the heat exchanger, other components, such as methanol, may be contained while the content (mass) of the other components is preferably less than the vinyl acetate content and more preferably less than half of the vinyl acetate content. A particularly preferred embodiment is to supply vinyl acetate substantially not containing other components to the heat exchanger.

The method of producing an EVA of the present invention includes the step of flowing vinyl acetate down in the heat exchanger while absorbing ethylene. The heat exchanger preferably circulates a coolant to remove heat from vinyl acetate that have absorbed ethylene. In this step, vinyl acetate is cooled in the heat exchanger to take sensible heat away, thereby allowing heat to be taken away from the reaction system. In addition, vinyl acetate absorbs ethylene to generate latent heat by condensing ethylene, thereby allowing heat to be taken away from the reaction system. That is, in the heat exchanger, it is possible to take away both heats of the latent heat by condensing ethylene and the sensible heat by cooling vinyl acetate. In this situation, although both the latent heat by condensing ethylene and the latent heat by dissolving vinyl acetate by ethylene theoretically generate, the latter is much smaller than the former and thus a total of both latent heats are referred herein to as latent heat by condensing ethylene.

In the production method of the present invention, vinyl acetate cooled to between −50° C. and 23° C. is supplied to the heat exchanger and thus the temperature difference between the coolant and vinyl acetate supplied to the heat exchanger becomes small, and compared with the case of supplying vinyl acetate at ordinary temperature, the sensible heat by cooling vinyl acetate becomes less. However, vinyl acetate at low temperatures facilitates dissolution of ethylene and thus the latent heat by condensing ethylene increases. The present inventors made investigations to find that the increment of the latent heat greatly exceeds the decrement of the sensible heat, and even when subtracting the decrement of the sensible heat for cooling vinyl acetate before supplied to the heat exchanger, the latent heat is greater. That is, cooling of vinyl acetate to be supplied to the heat exchanger allows improving the efficiency of heat removal in the entire system. It thus became clear that the efficiency of heat removal is improved only by supplying cooled vinyl acetate without changing the heat exchanger.

The structure of the heat exchanger is preferably, but not particularly limited to, a wetted-wall heat exchanger because it is preferred for the large contact area between the heat exchanger and vinyl acetate and also the large contact area between vinyl acetate and the ethylene gas. It is thus possible to effectively take heat away from vinyl acetate flowing down with a thin thickness on the wall surface and also to efficiently condense and dissolve the ethylene gas on the surface of vinyl acetate. The shape of the wall is preferably, but not particularly limited to, in the form of flowing vinyl acetate down in many pipes. The number, the diameter, the length, and the like of the pipes may be set considering the expected amount of heat removal and the like.

The method of contacting vinyl acetate with ethylene in the heat exchanger includes both a method of contact in a parallel flow and a method of contact in a countercurrent flow. The method of contact in a parallel flow is a method comprising supplying the pressurized gas containing ethylene to an upper portion of the heat exchanger and causing the pressurized gas containing ethylene to contact with vinyl acetate in a parallel flow in the heat exchanger. The method of contact in a countercurrent flow is a method comprising supplying the pressurized gas containing ethylene to a lower portion of the heat exchanger and causing the pressurized gas containing ethylene to contact with vinyl acetate in a countercurrent flow in the heat exchanger. A description for each method follows.

In the method of contact in a parallel flow, both the pressurized gas containing ethylene and vinyl acetate are introduced into the upper portion of the heat exchanger. Both then move downward while ethylene absorbs vinyl acetate. Since both move in the same forward direction, stable operation is readily maintained without the so-called flooding phenomenon in which the gas lifts vinyl acetate upward, resulting in backflow. Moreover, improvement in efficiency of heat removal by cooling vinyl acetate is significant compared with the method of contact in a countercurrent flow, and thus there is a great advantage of employing the method of the present invention.

Meanwhile, in the method of contact in a countercurrent flow, vinyl acetate is supplied to the upper portion of the heat exchanger and the pressurized gas containing ethylene is introduced into the lower portion of the heat exchanger. Then, while flowing downward, vinyl acetate absorbs the ethylene gas moving upward. Since each flow moves in the opposite direction to each other, there is a risk of causing the flooding phenomenon. A high pressure in the polymerization vessel causes an increase in the amount of the gas flowing into the heat exchanger and entrainment of droplets of the reaction liquid, and there is thus a risk of adhering scales in the heat exchanger. The method of contact in a countercurrent flow is preferred because such scales are less likely to be adhered than the method of contact in a parallel flow.

The method of producing an EVA of the present invention includes the step of letting vinyl acetate dissolving ethylene out of a bottom portion of the heat exchanger and adding to the reaction liquid in the polymerization vessel. Vinyl acetate at low temperatures with ethylene dissolved therein is added to the reaction liquid to cool the reaction liquid and also dissolve ethylene in the reaction liquid. Then, when ethylene dissolved in the reaction liquid evaporates, the latent heat of evaporation is taken away from the reaction liquid to allow removal of heat from the reaction liquid. The reaction temperature is thus allowed to be maintained uniformly. The temperature of ethylene-containing vinyl acetate is preferably between −10° C. and 40° C. The temperature is more preferably −5° C. or more and 30° C. or less.

The method of producing an EVA of the present invention includes the step of taking the reaction liquid out of the polymerization vessel. As described above, ethylene, vinyl acetate, the polymerization initiator, and methanol are continuously supplied to the reaction liquid in the polymerization vessel, and ethylene and vinyl acetate are consumed to produce an EVA. The reaction liquid having a predetermined polymerization ratio is continuously taken out of the polymerization vessel. The polymerization ratio of vinyl acetate is set considering the production efficiency, the degree of polymerization, and the like and is preferably from 25% to 60% and more preferably from 30% to 50%.

The EVA thus obtained preferably has an ethylene content from 15 to 55 mol %. A higher ethylene pressure in the polymerization vessel causes to produce an EVA having a higher ethylene content, and a lower ethylene pressure in the polymerization vessel causes to produce an EVA having a lower ethylene content. In the EVOH obtained by saponifying an EVA, a lower ethylene content causes the gas barrier properties to be good while causing reduction in the formability. On the contrary, a higher ethylene content causes the gas barrier properties to be reduced while causing the formability to be good. Accordingly, considering the applications of the EVOH and the like, the ethylene content has to be adjusted to a preferred content. The ethylene content is more preferably 45 mol % or less, even more preferably 40 mol % or less, and particularly preferably 35 mol % or less. Meanwhile, considering the efficiency of heat removal, a higher ethylene content is more advantageous and the ethylene content is more preferably 20 mol % or more and even more preferably 25 mol % or more.

The EVA thus obtained preferably has a degree of polymerization from 500 to 2000. The degree of polymerization is appropriately set considering the formability, the strength, and the like expected from the EVOH. The EVA preferably has a degree of polymerization of 600 or more and more preferably 700 or more. The EVA preferably has a degree of polymerization of 1600 or less and more preferably 1200 or less. A higher methanol content in the reaction liquid causes a lower degree of polymerization, and on the contrary, a lower methanol content causes a higher degree of polymerization, and it is thus possible to adjust the degree of polymerization of the EVA to be obtained by adjusting the methanol content in the reaction liquid.

The EVA thus obtained may be directly used in various applications while it is preferably saponified to produce an EVOH. The method of saponification is not particularly limited and a known method may be employed that the EVA is hydrolyzed in the presence of an alkaline catalyst.

Figure 1:
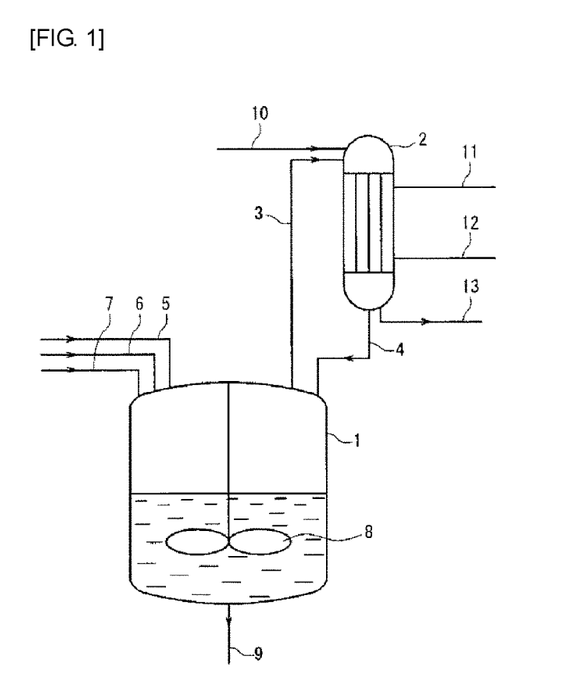
FIG. 1 illustrates an EVA polymerization apparatus used in Examples 1 through 8.

With reference to the drawings, specific polymerization apparatuses and polymerization methods using them are described below. FIG. 1 is a schematic view of the equipment used in Example 1, the equipment allowing vinyl acetate to contact with ethylene in a parallel flow in the heat exchanger.

To a polymerization vessel 1, a plurality of pipes 5, 6, and 7 are connected. The number and the arrangement of the pipes are not limited to the illustrated form. Through these pipes, ethylene, a polymerization initiator and methanol are supplied to the polymerization vessel 1. Depending on the case, part of vinyl acetate and other monomers may also be supplied through these pipes 5, 6, and 7. To secure the uniformity of the reaction solution, a stirrer 8 is preferably mounted in the polymerization vessel 1 to stir the reaction liquid. The reaction liquid in the polymerization vessel 1 is continuously discharged from a reaction liquid outlet pipe 9 connected to a bottom portion of the polymerization vessel 1. Around the polymerization vessel 1 is covered with a jacket, not shown, in which cooling water circulates.

To a heat exchanger 2, a vinyl acetate introduction pipe 10 is connected to supply vinyl acetate therethrough to an upper portion of the heat exchanger 2. From the perspective of efficiency of heat removal, the total amount of vinyl acetate to be supplied to the polymerization vessel 1 is preferably supplied from the vinyl acetate introduction pipe 10 through the heat exchanger 2, whereas part of vinyl acetate may be directly supplied to the polymerization vessel 1 from the pipes 5, 6, and 7 directly connected to the polymerization vessel 1 as long as not inhibiting the effects of the present invention.

To the heat exchanger 2, coolant pipes 11 and 12 are connected. Although the positions of the pipes are not limited to the illustrated form, the coolant is preferably supplied from the coolant pipe 12 connected to a lower portion of the heat exchanger 2 and discharged from the coolant pipe 11 connected to an upper portion of the heat exchanger 2. The connection in such a manner allows efficient cooling of vinyl acetate and efficient heat removal from the reaction liquid. The coolant is not particularly limited and allowed to use: an aqueous solution of alcohol, such as methanol, ethanol, ethylene glycol, and glycerin; an aqueous solution of common salt or calcium chloride; flon; and the like. From the reasons of ease of handling, costs, and the like, an aqueous alcohol solution, particularly an aqueous methanol solution is preferably used.

A gas discharge pipe 13 to discharge gas from the heat exchanger 2 is connected to a lower portion of the heat exchanger 2. To the gas discharge pipe 13, a mist separator (not shown) may be connected. The droplets in the discharged gas are removed by the mist separator to allow recovery or release of ethylene without mist. Such a mist separator is a device to separate droplets floating in gas using an external force, such as the gravity, a centrifugal force, and an electrostatic force, or an effect of screening or sieving. Examples of the mist separator may include a gravity settling chamber, a cyclone separator, an electrostatic precipitator, a scrubber, a bag filter, a packed bed. Among them, a cyclone separator is preferred.

Two pipes 3 and 4 connect the polymerization vessel 1 with the heat exchanger 2. The ethylene-containing gas is introduced from the polymerization vessel 1 through the pipe 3 into the upper portion of the heat exchanger 2, and vinyl acetate having absorbed ethylene is introduced from the lower portion of the heat exchanger 2 through the pipe 4 into the polymerization vessel 1.

Vinyl acetate as a material is supplied to the heat exchanger 2 through the vinyl acetate introduction pipe 10. Vinyl acetate supplied to the upper portion of the heat exchanger 2 absorbs ethylene while passing through the heat exchanger 2. The absorption of ethylene by vinyl acetate allows effective removal of the heat of polymerization. In this situation, it is important to supply vinyl acetate cooled to a temperature between −50° C. and 23° C. Supplying vinyl acetate cooled in advance allows efficient heat removal in the heat exchanger 2.

The ethylene-containing gas is introduced into the heat exchanger 2 through the pipe 3 connected to the upper portion of the heat exchanger 2. The pipe 3 and the vinyl acetate introduction pipe 10 on the heat exchanger side are connected to the upper portions of the heat exchanger 2. The connection of the pipe 3 to the upper portion of the heat exchanger allows inhibition of the flooding of vinyl acetate even when the amount of the supplied ethylene-containing gas is increased. In such a manner, the ethylene-containing gas falls in the heat exchanger 2, while contacting vinyl acetate, in parallel with the vinyl acetate-containing liquid. As a result, ethylene in the gas is dissolved in vinyl acetate.

The vinyl acetate-containing liquid having absorbed ethylene is introduced into the polymerization vessel 1 through the pipe 4. Ethylene then evaporates from the reaction liquid to allow removal of the heat of polymerization. In the case of continuous production, ethylene circulates through the polymerization vessel 1, the heat exchanger 2, and the pipes 3 and 4. Part of ethylene is contained in the EVA to be discharged from the reaction liquid outlet pipe 9, and thus ethylene is added from an ethylene supply source connected to the polymerization vessel 1 via at least one of the pipes 5, 6, and 7.

Figure 2:
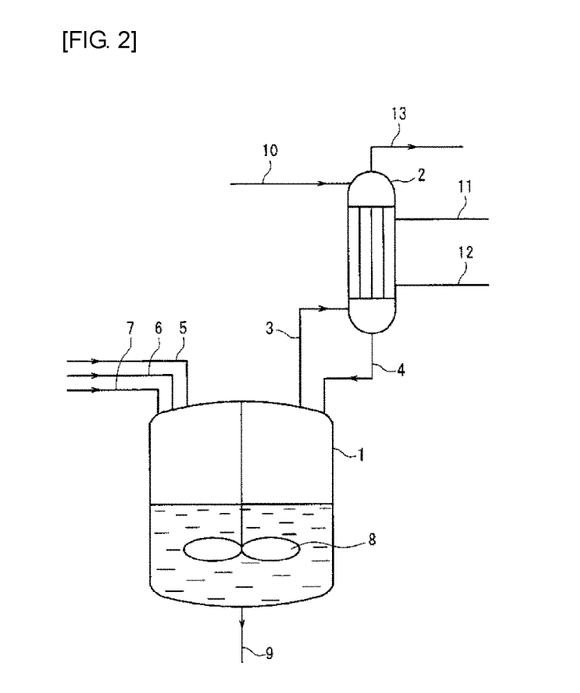
FIG. 2 illustrates an EVA polymerization apparatus used in Examples 9 through 16.

FIG. 2 is a schematic view of the equipment used in Example 2, the equipment allowing vinyl acetate to contact with ethylene in a countercurrent flow in a heat exchanger. This equipment has many components in common with those in the equipment for the method of contact in a parallel flow illustrated in FIG. 1, and thus only the differences are described below.

Two pipes 3 and 4 connect the polymerization vessel 1 with a heat exchanger 2, where the position of the pipe 3 connected to the heat exchanger 2 is different from that of the equipment in FIG. 1. This causes the ethylene-containing gas to be introduced from the polymerization vessel 1 through the pipe 3 into a lower portion of the heat exchanger 2 and the vinyl acetate-containing liquid having absorbed ethylene to be introduced from a lower portion of the heat exchanger 2 through the pipe 4 into the polymerization vessel 1. The connection of the pipe 3 to the lower portion of the heat exchanger causes the ethylene-containing gas to contact with the flowing down vinyl acetate-containing liquid in a countercurrent flow while rising in the heat exchanger, and thus ethylene in the gas is dissolved in the vinyl acetate-containing liquid. A gas discharge pipe 13 to discharge gas from the heat exchanger 2 is connected to the upper portion of the heat exchanger 2.

EXAMPLES

Example 1

Using the polymerization apparatus for contact in a parallel flow illustrated in FIG. 1, an EVA was continuously produced. A polymerization vessel 1 with an inner capacity of 750 L and a vertical wetted-wall multitubular heat exchanger 2 with a heat transfer area of 4 m² and 10 pipes were prepared. An example is described below in which vinyl acetate at −20° C. was supplied to produce an EVA having an ethylene content of 24.0 mol % and a degree of polymerization of 1080.

To maintain the pressure in the polymerization vessel 1 at 2.9 MPa, pressurized ethylene was supplied from the pipe 5 to the polymerization vessel 1. Adjustment of the pressure in the polymerization vessel 1 allows control the ethylene content in an EVA to be obtained. From the pipe 6, the polymerization initiator of 2,2'-azobis(4-methoxy-2,4-dimethylvaleronitrile) was introduced into the polymerization vessel 1 at a rate of 3 g/hr as a methanol solution. From the pipe 7, methanol was introduced into the polymerization vessel 1. Methanol was introduced at a rate of 6.2 kg/hr in total of the introduction rates from the pipes 6 and 7. Adjustment of the methanol content in the reaction liquid allows control of the degree of polymerization.

Vinyl acetate (VAc) cooled to −20° C. was supplied to the polymerization vessel 1 at a rate of 70.6 kg/hr via the vinyl acetate introduction pipe 10 and the heat exchanger 2. The ethylene-containing gas in the polymerization vessel 1 was introduced into the heat exchanger 2 via the pipe 3. Vinyl acetate flew down in the heat exchanger 2 along the surface of the pipe in the same direction as the ethylene-containing gas. Vinyl acetate having absorbed ethylene after flowing down had a temperature of 8° C. and ethylene-containing vinyl acetate was introduced into the polymerization vessel 1 via the pipe 4 to be mixed with the reaction liquid. In the reaction liquid, ethylene and vinyl acetate were continuously polymerized to continuously obtain a polymerization solution containing an EVA from the pipe 9. The temperature of the reaction liquid in the polymerization vessel 1 was maintained at 60° C.

During the reaction, 30 weight % of an aqueous methanol solution at −5° C. was supplied as the coolant from the pipe 12 and discharged from the pipe 11. In the heat exchanger 2, the coolant was supplied to flow in the opposite direction from the flow of vinyl acetate. The amount of heat removed by the heat exchanger 2 was 6803 kcal/hr. Cooling water was circulated through a jacket covering the polymerization vessel 1 for cooling from outside the polymerization vessel 1 as well. The circulation rate of the cooling water was constantly fixed. The polymerization ratio of vinyl acetate in the polymerization solution thus obtained was 40%. The ethylene-vinyl acetate copolymer (EVA) thus obtained had an ethylene content of 24.0 mol % and a degree of polymerization of 1080. These results are collectively shown in Table 1.

As shown in Example 1 of Table 1, tests similar to above were performed by varying the temperature of vinyl acetate supplied from the pipe 10 to 0° C., 5° C., 10° C., 20° C., and 25° C. During the tests, the temperature of the reaction liquid in the polymerization vessel 1 was maintained at 60° C. and the temperature of ethylene-containing vinyl acetate poured into the polymerization vessel 1 from the pipe 4 was maintained at 8° C. In addition, various conditions were adjusted to have a polymerization ratio of vinyl acetate of 40% and obtain an EVA having an ethylene content of 24.0 mol % and a degree of polymerization of 1080. The amount of introducing the polymerization initiator was changed in proportion to the square of the amount of supplied vinyl acetate. The circulation rate of the coolant supplied from the pipe 12 and the amount of vinyl acetate introduced from the pipe 10 were controlled to keep the temperature of ethylene-containing vinyl acetate introduced into the polymerization vessel 1 at 8° C. and the temperature of the polymerization vessel 1 at 60° C. As a result, the amount of vinyl acetate shown in Table 1 was supplied from the pipe 10 and the amount of heat shown in Table 1 was removed in the heat exchanger 2.

As seen from the results in Example 1, lowering the temperature of vinyl acetate supplied from the pipe 10 allowed an increase in the amount of supplied vinyl acetate and a marked increase in the amount of heat removal in the heat exchanger 2. Lowering the temperature of supplied vinyl acetate from 25° C. to −20° C. caused a significant increase in the amount of heat removal from 3453 kcal/hr to 6803 kcal/hr. The difference (A) in the amount of heat removal between vinyl acetate supplied at 25° C. and vinyl acetate supplied at −20° C. was 3351 kcal/hr. In this situation, the difference (B) in the amount of heat removed in advance by lowering the temperature of vinyl acetate supplied from the pipe 10 was 1359 kcal/hr, and thus the substantial amount of heat removal increased by lowering the temperature of supplied vinyl acetate was the difference ((A)−(B)) of 1992 kcal/hr. It thus became clear that lowering the temperature of supplied vinyl acetate allowed a significant increase in the amount of heat removal. Moreover, the amount of supplied vinyl acetate greatly increased from 36.1 kg/hr to 70.6 kg/hr and thus it was also possible to significantly improve productivity.

Examples 2 Through 8

In the same manner as in Example 1, EVAs were polymerized that had an ethylene content and a degree of polymerization shown in Tables 1 and 2. The coolant temperature and the polymerization temperature were fixed at −5° C. and 60° C., respectively. The polymerization ratio of vinyl acetate and the temperature of ethylene-containing vinyl acetate were set at the values shown in in Tables 1 and 2, and the temperature of vinyl acetate supplied from the pipe 10 was varied to −20° C., 0° C., 5° C., 10° C., 20° C., and 25° C. Tables 1 and 2 collectively show, under each condition, the pressure in the polymerization vessel 1, the amount of supplied vinyl acetate, and the amount of heat removal. It was found that, even when the EVAs having different ethylene contents and different degrees of polymerization were polymerized, lowering the temperature of supplied vinyl acetate allowed a significant increase in the amount of heat removal and significant improvement in the productivity.

TABLE 1

| | Ethylene Content (mol %) | Degree of Polymerization | Polymerization Ratio of VAc (%) | Polymerization Temperature (° C.) | Coolant Temperature (° C.) | Temperature of Ethylene-Containing VAc (° C.) | Pressure in Polymerization Vessel (MPa) |
|---|---|---|---|---|---|---|---|
| Example 1 | 24.0 | 1080 | 40 | 60 | −5 | 8 | 2.9 |
| | | | | | | | 2.9 |
| | | | | | | | 2.9 |
| | | | | | | | 2.9 |
| | | | | | | | 2.9 |
| | | | | | | | 2.9 |
| Example 2 | 18.0 | 1080 | 40 | 60 | −5 | 8 | 2.4 |
| | | | | | | | 2.4 |
| | | | | | | | 2.4 |
| | | | | | | | 2.4 |
| | | | | | | | 2.4 |
| | | | | | | | 2.4 |
| Example 3 | 21.0 | 1080 | 40 | 60 | −5 | 8 | 2.6 |
| | | | | | | | 2.6 |
| | | | | | | | 2.6 |
| | | | | | | | 2.6 |
| | | | | | | | 2.6 |
| | | | | | | | 2.7 |
| Example 4 | 27.7 | 1080 | 40 | 60 | −5 | 15 | 3.4 |
| | | | | | | | 3.4 |
| | | | | | | | 3.4 |
| | | | | | | | 3.4 |
| | | | | | | | 3.4 |
| | | | | | | | 3.4 |

| | Temperature of VAc (° C.) | Amount of Supplied VAc (kg/hr) | Amount of Heat Removal (kcal/hr) | Difference (A) in Amount of Heat Removal (kcal/hr) | Difference (B) in Amount of Heat in Supplied VAc (kcal/hr) | (A) − (B) (kcal/hr) |
|---|---|---|---|---|---|---|
| Example 1 | 25 | 36.1 | 3453 | 0 | 0 | 0 |
| | 20 | 38.2 | 3650 | 197 | 82 | 116 |
| | 10 | 43.0 | 4121 | 668 | 276 | 392 |
| | 5 | 46.0 | 4406 | 954 | 394 | 560 |
| | 0 | 49.4 | 4735 | 1283 | 528 | 755 |
| | −20 | 70.6 | 6803 | 3351 | 1359 | 1992 |
| Example 2 | 25 | 36.9 | 2883 | 0 | 0 | 0 |
| | 20 | 39.0 | 3050 | 167 | 84 | 83 |
| | 10 | 44.1 | 3449 | 566 | 283 | 283 |
| | 5 | 47.2 | 3691 | 808 | 404 | 404 |
| | 0 | 50.7 | 3970 | 1087 | 542 | 545 |
| | −20 | 72.6 | 5712 | 2829 | 1399 | 1430 |
| Example 3 | 25 | 36.4 | 3141 | 0 | 0 | 0 |
| | 20 | 38.4 | 3321 | 180 | 82 | 97 |

TABLE 1-continued

|  |  |  |  |  |  |  |
|---|---|---|---|---|---|---|
|  |  | 10 | 43.3 | 3750 | 609 | 278 | 331 |
|  |  | 5 | 46.3 | 4010 | 869 | 396 | 473 |
|  |  | 0 | 49.7 | 4310 | 1169 | 532 | 637 |
|  |  | −20 | 71.0 | 6177 | 3035 | 1367 | 1668 |
|  | Example 4 | 25 | 40.1 | 4167 | 0 | 0 | 0 |
|  |  | 20 | 42.3 | 4399 | 232 | 91 | 141 |
|  |  | 10 | 47.6 | 4966 | 799 | 306 | 493 |
|  |  | 5 | 50.8 | 5306 | 1139 | 435 | 704 |
|  |  | 0 | 54.5 | 5700 | 1533 | 584 | 949 |
|  |  | −20 | 77.7 | 8183 | 4016 | 1496 | 2520 |

TABLE 2

| | Ethylene Content (mol %) | Degree of Polymerization | Polymerization Ratio of VAc (%) | Polymerization Temperature (° C.) | Coolant Temperature (° C.) | Temperature of Ethylene-Containing VAc (° C.) | Pressure in Polymerization Vessel (MPa) |
|---|---|---|---|---|---|---|---|
| Example 5 | 32.6 | 1080 | 39 | 60 | −5 | 25 | 4.1 |
|  |  |  |  |  |  |  | 4.1 |
|  |  |  |  |  |  |  | 4.1 |
|  |  |  |  |  |  |  | 4.1 |
|  |  |  |  |  |  |  | 4.1 |
|  |  |  |  |  |  |  | 4.1 |
| Example 6 | 27.7 | 800 | 47 | 60 | −5 | 11 | 3.1 |
|  |  |  |  |  |  |  | 3.1 |
|  |  |  |  |  |  |  | 3.1 |
|  |  |  |  |  |  |  | 3.1 |
|  |  |  |  |  |  |  | 3.1 |
|  |  |  |  |  |  |  | 3.1 |
| Example 7 | 32.6 | 800 | 46 | 60 | −5 | 20 | 3.9 |
|  |  |  |  |  |  |  | 3.9 |
|  |  |  |  |  |  |  | 3.9 |
|  |  |  |  |  |  |  | 3.9 |
|  |  |  |  |  |  |  | 3.9 |
|  |  |  |  |  |  |  | 3.9 |
| Example 8 | 44.0 | 960 | 35 | 60 | −5 | 26 | 5.7 |
|  |  |  |  |  |  |  | 5.7 |
|  |  |  |  |  |  |  | 5.7 |
|  |  |  |  |  |  |  | 5.7 |
|  |  |  |  |  |  |  | 5.7 |
|  |  |  |  |  |  |  | 5.7 |

| | | Temperature of VAc (° C.) | Amount of Supplied VAc (kg/hr) | Amount of Heat Removal (kcal/hr) | Difference (A) in Amount of Heat Removal (kcal/hr) | Difference (B) in Amount of Heat in Supplied VAc (kcal/hr) | (A) − (B) (kcal/hr) |
|---|---|---|---|---|---|---|---|
|  | Example 5 | 25 | 54.0 | 6283 | 0 | 0 | 0 |
|  |  | 20 | 56.7 | 6605 | 322 | 121 | 201 |
|  |  | 10 | 62.0 | 7179 | 896 | 398 | 498 |
|  |  | 5 | 66.0 | 7657 | 1374 | 565 | 809 |
|  |  | 0 | 71.0 | 8280 | 1996 | 759 | 1237 |
|  |  | −20 | 96.5 | 11335 | 5052 | 1858 | 3194 |
|  | Example 6 | 25 | 38.0 | 3786 | 0 | 0 | 0 |
|  |  | 20 | 39.4 | 3926 | 140 | 84 | 55 |
|  |  | 10 | 42.2 | 4214 | 428 | 271 | 157 |
|  |  | 5 | 42.0 | 4380 | 593 | 359 | 234 |
|  |  | 0 | 45.6 | 4559 | 773 | 488 | 285 |
|  |  | −20 | 54.2 | 5431 | 1645 | 1043 | 602 |
|  | Example 7 | 25 | 36.6 | 4281 | 0 | 0 | 0 |
|  |  | 20 | 37.8 | 4434 | 153 | 81 | 72 |
|  |  | 10 | 40.5 | 4750 | 469 | 260 | 209 |
|  |  | 5 | 31.9 | 4931 | 650 | 273 | 377 |
|  |  | 0 | 43.6 | 5128 | 847 | 467 | 380 |
|  |  | −20 | 51.5 | 6075 | 1794 | 992 | 802 |
|  | Example 8 | 25 | 27.5 | 5130 | 0 | 0 | 0 |
|  |  | 20 | 29.7 | 5394 | 264 | 64 | 200 |
|  |  | 10 | 32.0 | 5804 | 674 | 205 | 469 |
|  |  | 5 | 33.4 | 6072 | 942 | 286 | 656 |
|  |  | 0 | 35.0 | 6369 | 1239 | 374 | 865 |
|  |  | −20 | 44.5 | 8199 | 3069 | 856 | 2213 |

Example 9

Using the polymerization apparatus for contact in a countercurrent flow illustrated in FIG. 2, an EVA was continuously produced. The equipment has the same specifications as the production equipment for contact in a parallel flow used in Example 1 except for having the pipe 3 and the gas discharge pipe 13 connected to different positions in the heat exchanger 2. An example is described below in which vinyl acetate at −20° C. was supplied to produce an EVA having an ethylene content of 24.0 mol % and a degree of polymerization of 1080.

To maintain the pressure in the polymerization vessel 1 at 2.9 MPa, pressurized ethylene was supplied from the pipe 5 to the polymerization vessel 1. Adjustment of the pressure in the polymerization vessel 1 allows control the ethylene content in an EVA to be obtained. From the pipe 6, the polymerization initiator of 2,2'-azobis(4-methoxy-2,4-dimethylvaleronitrile) was introduced into the polymerization vessel 1 at a rate of 3 g/hr as a methanol solution. From the pipe 7, methanol was introduced into the polymerization vessel 1. Methanol was introduced at a rate of 4.4 kg/hr in total of the introduction rates from the pipes 6 and 7. Adjustment of the methanol content in the reaction liquid allows control of the degree of polymerization.

Vinyl acetate (VAc) cooled to −20° C. was supplied to the polymerization vessel 1 at a rate of 75.0 kg/hr via the vinyl acetate introduction pipe 10 and the heat exchanger 2. The ethylene-containing gas in the polymerization vessel 1 was introduced into the heat exchanger 2 via the pipe 3. Vinyl acetate flew down in the heat exchanger 2 along the surface of the pipe in the opposite direction from the flow of the ethylene-containing gas. Vinyl acetate having absorbed ethylene after flowing down had a temperature of 2° C. and ethylene-containing vinyl acetate was introduced into the polymerization vessel 1 via the pipe 4 to be mixed with the reaction liquid. In the reaction liquid, ethylene and vinyl acetate were continuously polymerized to continuously obtain a polymerization solution containing an EVA from the pipe 9. The temperature of the reaction liquid in the polymerization vessel 1 was maintained at 60° C.

During the reaction, 30 weight % of an aqueous methanol solution at −5° C. was supplied as the coolant from the pipe 12 and discharged from the pipe 11. In the heat exchanger 2, the coolant was supplied to flow in the opposite direction from the flow of vinyl acetate. The amount of heat removed by the heat exchanger 2 was 5647 kcal/hr. Cooling water was circulated through a jacket covering the polymerization vessel 1 for cooling from outside the polymerization vessel 1 as well. The circulation rate of the cooling water was constantly fixed. The polymerization ratio of vinyl acetate in the polymerization solution thus obtained was 40%. The ethylene-vinyl acetate copolymer (EVA) thus obtained had an ethylene content of 24.0 mol % and a degree of polymerization of 1080.

As shown in Example 9 of Table 3, tests similar to above were performed by varying the temperature of vinyl acetate supplied from the pipe 10 to 0° C., 5° C., 10° C., 20° C., and 25° C. During the tests, the temperature of the reaction liquid in the polymerization vessel 1 was maintained at 60° C. and the temperature of ethylene-containing vinyl acetate poured into the polymerization vessel 1 from the pipe 4 was maintained at 2° C. In addition, various conditions were adjusted to have a polymerization ratio of vinyl acetate of 40% and obtain an EVA having an ethylene content of 24.0 mol % and a degree of polymerization of 1080. The amount of introducing the polymerization initiator was changed in proportion to the amount of supplied vinyl acetate. The circulation rate of the coolant supplied from the pipe 12 and the amount of vinyl acetate supplied from the pipe 10 were controlled to keep the temperature of ethylene-containing vinyl acetate supplied to the polymerization vessel 1 at 2° C. and the temperature of the polymerization vessel 1 at 60° C. As a result, the amount of vinyl acetate shown in Table 3 was supplied from the pipe 10 and the amount of heat shown in Table 3 was removed in the heat exchanger 2.

As seen from the results in Example 9, lowering the temperature of vinyl acetate supplied from the pipe 10 allowed an increase in the amount of supplied vinyl acetate and an increase in the amount of heat removal in the heat exchanger 2. Lowering the temperature of supplied vinyl acetate from 25° C. to −20° C. caused an increase in the amount of heat removal from 3847 kcal/hr to 5647 kcal/hr. The difference (A) in the amount of heat removal between vinyl acetate supplied at 25° C. and vinyl acetate supplied at −20° C. was 1800 kcal/hr. In this situation, the difference (B) in the amount of heat removed in advance by lowering the temperature of vinyl acetate supplied from the pipe 10 was 1445 kcal/hr, and thus the substantial amount of heat removal increased by lowering the temperature of supplied vinyl acetate was the difference ((A)−(B)) of 355 kcal/hr. It thus became clear that lowering the temperature of supplied vinyl acetate allowed an increase in the amount of heat removal. Moreover, the amount of supplied vinyl acetate increased from 51.4 kg/hr to 75.0 kg/hr and thus it was also possible to improve productivity.

Examples 10 Through 16

In the same manner as in Example 9, EVAs were polymerized that had an ethylene content and a degree of polymerization shown in Tables 3 and 4. The coolant temperature and the polymerization temperature were fixed at −5° C. and 60° C., respectively. The polymerization ratio of vinyl acetate and the temperature of ethylene-containing vinyl acetate were set at the values shown in in Tables 3 and 4, and the temperature of vinyl acetate supplied from the pipe 10 was varied to −20° C., 0° C., 5° C., 10° C., 20° C., and 25° C. Tables 3 and 4 collectively show, under each condition, the pressure in the polymerization vessel 1, the amount of supplied vinyl acetate, and the amount of heat removal. It was found that, even when the EVAs having different ethylene contents and different degrees of polymerization were polymerized, lowering the temperature of supplied vinyl acetate allowed an increase in the amount of heat removal and improvement in the productivity.

TABLE 3

|  | Ethylene Content (mol %) | Degree of Polymerization | Polymerization Ratio of VAc (%) | Polymerization Temperature (° C.) | Coolant Temperature (° C.) | Temperature of Ethylene-Containing VAc (° C.) | Pressure in Polymerization Vessel (MPa) |
|---|---|---|---|---|---|---|---|
| Example 9 | 24.0 | 1080 | 40 | 60 | −5 | 2 | 2.9 |
|  |  |  |  |  |  |  | 2.9 |
|  |  |  |  |  |  |  | 2.9 |
|  |  |  |  |  |  |  | 2.9 |

TABLE 3-continued

| | | | | | | | |
|---|---|---|---|---|---|---|---|
| Example 10 | 18.0 | 1080 | 40 | 60 | −5 | −2 | 2.9 |
| | | | | | | | 2.9 |
| | | | | | | | 2.5 |
| | | | | | | | 2.5 |
| | | | | | | | 2.5 |
| | | | | | | | 2.5 |
| | | | | | | | 2.5 |
| Example 11 | 21.0 | 1080 | 40 | 60 | −5 | 1 | 2.7 |
| | | | | | | | 2.7 |
| | | | | | | | 2.7 |
| | | | | | | | 2.7 |
| | | | | | | | 2.7 |
| | | | | | | | 2.7 |
| Example 12 | 27.0 | 1080 | 40 | 60 | −5 | 6 | 3.5 |
| | | | | | | | 3.5 |
| | | | | | | | 3.5 |
| | | | | | | | 3.5 |
| | | | | | | | 3.5 |
| | | | | | | | 3.5 |

| | | Temperature of VAc (° C.) | Amount of Supplied VAc (kg/hr) | Amount of Heat Removal (kcal/hr) | Difference (A) in Amount of Heat Removal (kcal/hr) | Difference (B) in Amount of Heat in Supplied VAc (kcal/hr) | (A) − (B) (kcal/hr) |
|---|---|---|---|---|---|---|---|
| Example 9 | | 25 | 51.4 | 3847 | 0 | 0 | 0 |
| | | 20 | 51.9 | 3985 | 138 | 111 | 26 |
| | | 10 | 57.4 | 4303 | 456 | 368 | 88 |
| | | 5 | 59.7 | 4480 | 633 | 511 | 122 |
| | | 0 | 62.3 | 4672 | 825 | 666 | 159 |
| | | −20 | 75.0 | 5647 | 1800 | 1445 | 355 |
| Example 10 | | 25 | 60.3 | 3969 | 0 | 0 | 0 |
| | | 20 | 62.9 | 4152 | 182 | 135 | 48 |
| | | 10 | 68.7 | 4531 | 561 | 441 | 120 |
| | | 5 | 72.1 | 4755 | 786 | 617 | 169 |
| | | 0 | 75.8 | 5003 | 1034 | 811 | 223 |
| | | −20 | 95.5 | 6330 | 2361 | 1840 | 521 |
| Example 11 | | 25 | 53.8 | 3672 | 0 | 0 | 0 |
| | | 20 | 55.8 | 3825 | 153 | 120 | 33 |
| | | 10 | 60.4 | 4128 | 456 | 388 | 68 |
| | | 5 | 63.0 | 4307 | 635 | 539 | 96 |
| | | 0 | 65.8 | 4502 | 830 | 704 | 126 |
| | | −20 | 80.2 | 5502 | 1830 | 1544 | 286 |
| Example 12 | | 25 | 53.6 | 4685 | 0 | 0 | 0 |
| | | 20 | 55.6 | 4886 | 201 | 119 | 82 |
| | | 10 | 60.2 | 5273 | 589 | 386 | 203 |
| | | 5 | 62.8 | 5504 | 820 | 537 | 283 |
| | | 0 | 65.6 | 5757 | 1072 | 702 | 370 |
| | | −20 | 80.1 | 7055 | 2371 | 1543 | 828 |

TABLE 4

| | Ethylene Content (mol %) | Degree of Polymerization | Polymerization Ratio of VAc (%) | Polymerization Temperature (° C.) | Coolant Temperature (° C.) | Temperature of Ethylene-Containing VAc (° C.) | Pressure in Polymerization Vessel (MPa) |
|---|---|---|---|---|---|---|---|
| Example 13 | 32.0 | 1080 | 39 | 60 | −5 | 14 | 4.1 |
| | | | | | | | 4.1 |
| | | | | | | | 4.1 |
| | | | | | | | 4.1 |
| | | | | | | | 4.1 |
| | | | | | | | 4.1 |
| Example 14 | 27.0 | 800 | 47 | 60 | −5 | −3 | 3.1 |
| | | | | | | | 3.1 |
| | | | | | | | 3.1 |
| | | | | | | | 3.1 |
| | | | | | | | 3.1 |
| | | | | | | | 3.1 |
| Example 15 | 32.0 | 800 | 46 | 60 | −5 | 9 | 3.9 |
| | | | | | | | 3.9 |
| | | | | | | | 3.9 |

TABLE 4-continued

| | | | | | | 3.9 |
| --- | --- | --- | --- | --- | --- | --- |
| | | | | | | 3.9 |
| | | | | | | 3.9 |
| Example 16 | 44.0 | 960 | 35 | 60 | −5 | 29 | 5.7 |
| | | | | | | 5.7 |
| | | | | | | 5.7 |
| | | | | | | 5.7 |
| | | | | | | 5.7 |
| | | | | | | 5.7 |

| | | Temperature of VAc (° C.) | Amount of Supplied VAc (kg/hr) | Amount of Heat Removal (kcal/hr) | Difference (A) in Amount of Heat Removal (kcal/hr) | Difference (B) in Amount of Heat in Supplied VAc (kcal/hr) | (A) − (B) (kcal/hr) |
| --- | --- | --- | --- | --- | --- | --- | --- |
| Example 13 | | 25 | 48.5 | 4704 | 0 | 0 | 0 |
| | | 20 | 50.3 | 4905 | 201 | 108 | 93 |
| | | 10 | 54.0 | 5246 | 541 | 346 | 195 |
| | | 5 | 56.0 | 5451 | 747 | 480 | 267 |
| | | 0 | 58.3 | 5674 | 970 | 624 | 346 |
| | | −20 | 69.5 | 6786 | 2082 | 1338 | 744 |
| Example 14 | | 25 | 41.1 | 3640 | 0 | 0 | 0 |
| | | 20 | 42.3 | 3755 | 115 | 91 | 24 |
| | | 10 | 44.9 | 3978 | 338 | 288 | 50 |
| | | 5 | 46.3 | 4105 | 465 | 396 | 69 |
| | | 0 | 47.8 | 4240 | 600 | 511 | 89 |
| | | −20 | 55.0 | 4888 | 1248 | 1058 | 190 |
| Example 15 | | 25 | 46.0 | 4451 | 0 | 0 | 0 |
| | | 20 | 47.1 | 4584 | 133 | 101 | 32 |
| | | 10 | 49.6 | 4807 | 357 | 318 | 39 |
| | | 5 | 50.9 | 4940 | 489 | 436 | 53 |
| | | 0 | 52.3 | 5079 | 629 | 560 | 69 |
| | | −20 | 58.9 | 5731 | 1280 | 1134 | 146 |
| Example 16 | | 25 | 28.3 | 3980 | 0 | 0 | 0 |
| | | 20 | 29.0 | 4073 | 93 | 62 | 31 |
| | | 10 | 30.3 | 4266 | 286 | 195 | 91 |
| | | 5 | 31.0 | 4371 | 391 | 266 | 125 |
| | | 0 | 31.8 | 4481 | 501 | 340 | 161 |
| | | −20 | 35.3 | 4989 | 1009 | 680 | 329 |

As seen from comparison of Tables 1 through 4, the difference ((A)−(B)) in the substantial amount of heat removal compared with the case of vinyl acetate having a temperature of 25° C. was greater with the polymerization apparatuses for contact in a parallel flow than the polymerization apparatuses for contact in a countercurrent flow. It is thus understood that polymerization apparatuses for contact in a parallel flow have a greater advantage of supplying vinyl acetate at low temperatures than polymerization apparatuses for contact in a countercurrent flow.

DESCRIPTIONS OF SYMBOLS

1 Polymerization Vessel
2 Heat Exchanger
3-7 Pipe
8 Stirrer
9 Reaction Liquid Outlet Pipe
10 Vinyl Acetate Introduction Pipe
11, 12 Coolant Pipe
13 Gas Discharge Pipe

The invention claimed is:

1. A method of continuously producing an ethylene-vinyl acetate copolymer in a polymerization vessel containing a reaction liquid containing ethylene, vinyl acetate, a polymerization initiator and methanol, the polymerization vessel being connected via piping to a heat exchanger circulating a coolant, the method comprising the steps of:
supplying ethylene, the polymerization initiator and methanol to the polymerization vessel;
introducing pressurized gas containing ethylene present in a gas phase portion of the polymerization vessel into the heat exchanger;
supplying vinyl acetate cooled to between −50° C. and 23° C. to an upper portion of the heat exchanger prior to the vinyl acetate absorbing the ethylene;
flowing vinyl acetate down in the heat exchanger while absorbing ethylene;
letting vinyl acetate dissolving ethylene out of a bottom portion of the heat exchanger and adding to the reaction liquid in the polymerization vessel; and
taking the reaction liquid out of the polymerization vessel.

2. The production method according to claim 1, wherein vinyl acetate cooled to between −50° C. and 10° C. is supplied to the upper portion of the heat exchanger.

3. The production method according to claim 1, wherein the pressurized gas containing ethylene is supplied to the upper portion of the heat exchanger to contact the pressurized gas containing ethylene with vinyl acetate in a parallel flow in the heat exchanger.

4. The production method according to claim 1, wherein the pressurized gas containing ethylene is supplied to a lower portion of the heat exchanger to contact the pressurized gas containing ethylene with vinyl acetate in a countercurrent flow in the heat exchanger.

5. The production method according to claim 1, wherein the ethylene-vinyl acetate copolymer thus obtained has an ethylene content from 15 to 55 mol %.

6. The production method according to claim 1, wherein the heat exchanger is a wetted-wall heat exchanger.

7. The production method according to claim 1, wherein the polymerization initiator is selected from the group consisting of diacyl peroxide initiators, valeronitrile initiators, and peroxydicarbonate initiators.

8. The production method according to claim 1, wherein a temperature of the reaction liquid in the polymerization vessel is between 40° C. and 80° C.

9. The production method according to claim 1, wherein a temperature of the reaction liquid in the polymerization vessel is between 50° C. and 70° C.

10. The production method according to claim 1, wherein a pressure in the polymerization vessel is between 1.5 MPa and 8 MPa.

11. The production method according to claim 1, wherein a pressure in the polymerization vessel is between 3 MPa and 5 MPa.

12. The production method according to claim 1, wherein 8 to 60 parts of ethylene is supplied to the polymerization vessel per 100 parts by mass of vinyl acetate.

13. The production method according to claim 1, wherein 0.5 to 25 parts by mass of methanol is supplied to the polymerization vessel per 100 parts by mass of vinyl acetate.

14. The production method according to claim 1, wherein 0.001 to 0.05 part by mass of the polymerization initiator is supplied to the polymerization vessel per 100 parts by mass of vinyl acetate.

15. The production method according to claim 1, further comprising saponifying the ethylene-vinyl acetate copolymer.

* * * * *